Sept. 5, 1944.    G. H. GUDERIAN    2,357,733
ANCHOR FOR FLEXIBLE CABLES AND METHOD OF SECURING THE SAME THERETO
Filed Feb. 3, 1942
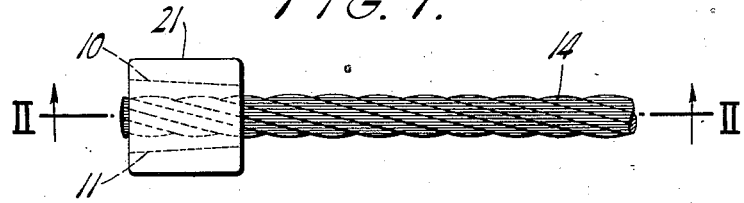
FIG. 1.
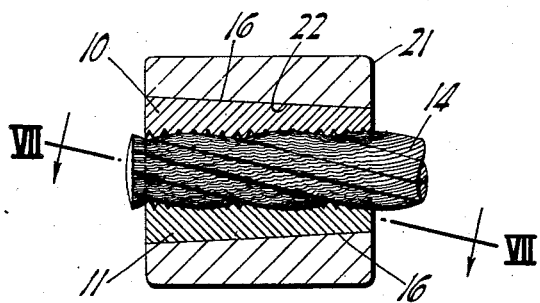
FIG. 2.
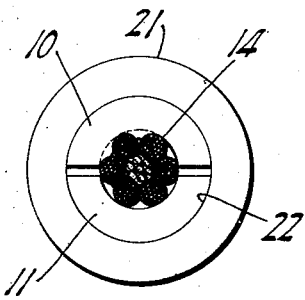
FIG. 3.
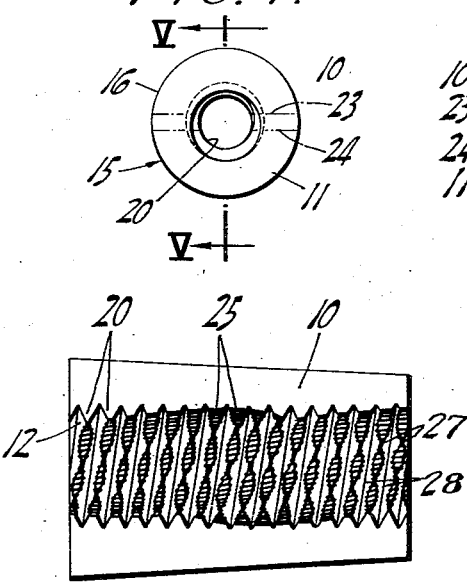
FIG. 4.
FIG. 6.
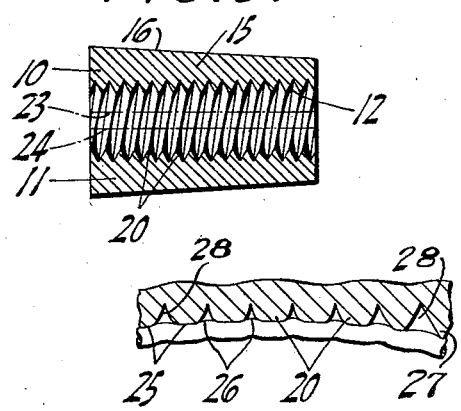
FIG. 5.
FIG. 7.
INVENTOR
George H. Guderian
BY
Bean, Brooks, Buckley & Bean
ATTORNEYS Patented Sept. 5, 1944

2,357,733

UNITED STATES PATENT OFFICE 2,357,733

ANCHOR FOR FLEXIBLE CABLES AND A METHOD OF SECURING THE SAME THERETO

George H. Guderian, North Tonawanda, N. Y., assignor to Columbus McKinnon Chain Corporation, Tonawanda, N. Y., a corporation of New York Application February 3, 1942, Serial No. 429,435

5 Claims. (Cl. 29—148)

My invention relates in general to anchors for flexible steel cables and particularly to clamping means which may be secured to the end of a cable and by which the cable may be fastened, for instance, to the drum of a wire rope hoist.

In my experiments with cable clamps or anchors, I have found that by providing interspaced ridges or V-shaped threads on the interior surfaces of the jaws and by forming the cable with corrugations or interspaced bends for engagement with said threads, abutments are provided which clamp the cable within the anchor in very efficient manner.

The principal object of my invention, therefore, has been to provide an anchor having jaws which are provided with relatively soft ridges or screwthreads which are conformed substantially to the exterior surface of the cable when the anchor is being assembled.

Another object has been to provide the cable with corrugations or a plurality of interspaced bends for engagement with the ridges or screwthreads of the jaws.

A further object has been to provide a method whereby when the anchor is being assembled upon the cable, the relatively soft interspaced ridges will be conformed substantially to the cable contour and the cable will be formed with a wavy or corrugated exterior, thereby forming abutments for engagement with the ridges.

Another object has been to provide jaws having ridges or threads formed with flattened surfaces which increase the area of contact of the jaw with the wires of the cable.

Moreover, my invention is of such nature that the cross-sectional area of the wires of the cable will be maintained without any mutilation or indentations, whereby the strength of the wires will not be reduced.

Furthermore, I provide my anchor with a steel sleeve which is hardened or heat-treated so as to reduce its ductility and thereby to prevent stretching when assembling the anchor.

The above objects and advantages have been accomplished by the device shown in the accompanying drawing, of which:

Fig. 1 is a side elevation of my invention as applied to a wire rope cable;

Fig. 2 is an enlarged sectional view taken on line II—II of Fig. 1;

Fig. 3 is an enlarged end elevation of the anchor as shown in Fig. 2;

Fig. 4 is an enlarged end elevation of the completed plug member ready to be split to form the jaws of my invention;

Fig. 5 is a side sectional elevation of the plug member taken on line V—V of Fig. 4;

Fig. 6 is a greatly enlarged inner face view of one of the jaws showing the flattened portions of the threads where they engage the wires of the cable; and, Fig. 7 is an enlarged sectional elevation of the corrugations or interspaced bends formed in the wires of the cable by the flattening action of the threads of the jaws, taken on line VII—VII of Fig. 2.

My anchor comprises cable embracing means in the form of jaws 10 and 11, each having a longitudinal groove or cable seat 12 formed with transversely extending ridges 20 of softer material than the cable 14.

In the manufacture of the jaws I preferably make a plug member 15 in cylindrical form having a suitably shaped exterior surface 16. This member is drilled longitudinally and is then provided with a plurality of ridges 20. These ridges may be formed in any suitable way but I have found it convenient to pass a screwthreading tap through the longitudinal hole whereby V-shaped ridges are formed.

After the plug member is finished it is slit on lines marked 23 and 24, thus forming the jaws 10 and 11. In splitting the plug member a portion of the metal is removed so that there is sufficient space between the adjacent surfaces of the jaws when first assembled on the cable to compensate for movement toward each other when being subsequently forced in place upon the cable.

In carrying out my invention the jaws 10 and 11 must be forced into contact with the cable under considerable pressure. Any suitable means may be employed to accomplish this compressing action but I have found it convenient to employ an outer sleeve 21 formed with a tapered bore 22. The outer surface 16 of the plug member 15 is also tapered to conform to the tapered bore of the sleeve so that when the jaws are formed and assembled within the sleeve they will snugly fit the tapered surface thereof. The sleeve is preferably made of high carbon steel or heat-treated steel which is hardened to reduce its ductility so that the jaws will be firmly pressed into engagement with the cable in the act of assembling my anchor.

The cable 14 to which the anchor is to be attached has the strands and wires at its end preferably secured together by means of welding so that there will be no fraying during the act of assembling. When assembling my anchor the jaws are placed at opposite sides and near the end of the cable with their larger ends toward such cable end, and the sleeve 21 is slipped over the jaws. Great pressure is then applied axially to the jaws and the engaged cable to force them into the sleeve. Such pressure causes the tangentially arranged threads 20, due to their relative softness, to be forced toward and into the outer surface of the cable, thus forming flattened surfaces 25 where the threads contact with the exterior wires of the strands, intervening portions 27 of the threads remaining substantially undeformed. Such circumferential formation increases the bearing area on the cable and forms longitudinally arranged points of pressure where the threads engage the cable. Alternate points of relief are also provided longitudinally of the cable between the points of pressure and opposite the intervening undeformed valleys 28. Furthermore, the wires of the strands are impressed and embedded into the flattened surfaces 25, as shown in Fig. 6, whereby to more firmly grip the wires of the cable.

As shown in Fig. 7, as the jaws are forced toward the cable in the formation of the flattened surfaces 25, these spaced flattened surfaces with the intervening valley portions 28 form crimping faces and give to the wires of the cable a plurality of interspaced bends or corrugations 26 in hill and dale formation, thereby forming abutments between the threads and with which the threads engage, thus efficiently resisting axial movement of the anchor upon the cable when placed in service. The pitch of the ridges or threads formed in the cable seat has a definite bearing upon the gripping action of the anchor; and, while this pitch may be varied considerably, it is preferable that the spacing be such that definite corrugations are formed in the wires between the ridges.

In carrying out the invention above described, it is obvious that a steel cable of usual construction be employed, made up of strands and wires with the usual flexible core, whereby when compressed by the jaws there will be sufficient resiliency to form the corrugations herein described.

While I have described the outer sleeve 21 as being made of hardened steel, it is obvious that any other suitable material may be employed, it being only necessary that in the act of assembling the jaws 10 and 11 be pressed into contact with the cable with sufficient force to form the flattened surfaces 25 of the threads and to form the corrugations 26 in the wires of the cable. In carrying out my invention, it is preferable to use soft steel for the jaws 10 and 11 but obviously any material may be used which has sufficient ductility to form the flattened cable-engaging surfaces while at the same time being sufficiently rigid to crimp the wires of the cable. Furthermore, while I have shown and described my anchor as receiving some of its peculiar characteristics during the act of assembling, it is obvious that the flattened surfaces in the threads of the jaws as well as the corrugations of the cable wires may be initially preformed so that when assembling the flattened surfaces of the threads will engage the abutments formed by the wire corrugations, in which instance the relative degrees of softness may not have to be maintained.

Obviously, these and other modifications of the details herein shown and described may be made without departing from the spirit of my invention or the scope of the appended claims, and I do not, therefore, wish to be limited to the exact embodiment herein shown and described, the forms shown being merely a preferred embodiment thereof.

I claim:

1. A cable anchor comprising cable embracing means having a seat formed with transversely extending spaced ridges of softer material than the wires of the cable, said ridges being formed with spaced contacting portions deformed to conform to the exterior wires of the strands of the cable, said ridges having interspaced undeformed portions extending between the strands of the cable to interlock with the cable, and means for exerting and maintaining clamping pressure on said embracing means.

2. A cable anchor comprising cable embracing means having a seat formed with transversely extending spaced ridges of softer material than the wires of the cable, each of said ridges being formed throughout its circumference with a plurality of spaced flattened surfaces for conforming contact with the exterior wires of the cable, said ridges having undeformed root portions to provide intervening pockets for reception of corrugated abutments formed in the wires, and means for holding said embracing means in position.

3. A cable anchor comprising cable embracing means having a seat formed with transversely extending spaced ridges of softer material than the wires of the cable, said ridges being formed with spaced contacting portions deformed to conform to the exterior wires of the strands of the cable, said ridges having interspaced undeformed portions extending between the strands of the cable to interlock with the cable, said ridges having interspaced undeformed root portions to provide intervening pockets to receive corrugations formed in the exposed wires of the strands between the contacting surfaces at the tops of the ridges, and means for holding said embracing means in position.

4. A cable anchor, comprising an outer hardened steel shell having a tapered bore, cable embracing means formed with an exterior tapered surface for engagement with the tapered bore of the shell, said cable embracing means having a seat formed with transversely extending spaced ridges of softer material than the wires of the cable, said ridges being formed with spaced contacting portions deformed to conform to the exterior wires of the strands of the cable, said ridges having interspaced undeformed portions extending between the strands of the cable to interlock with the cable, said ridges having undeformed root portions to provide intervening pockets to receive corrugations formed in the exposed wires of the strands by and between the contacting surfaces at the tops of the ridges.

5. A method of fastening a twisted multistrand cable to an anchor having a plurality of internal, cable-engaging circumferential ribs, applying said anchor to the cable, resiliently supporting the outer strands of said cable, bending said outer strands inwardly at points opposite the spaced tangential exposed surfaces of said ribs by pressure exerted upon said anchor, and simultaneously forging said anchor to form a plurality of circumferentially-spaced partially flattened surfaces on said ribs at points to engage the bends in said strands.

GEORGE H. GUDERIAN.